(12) United States Patent
Konishi (10) Patent No.: US 11,992,940 B2
(45) Date of Patent: May 28, 2024

(54) ARTICULATED ROBOT

(71) Applicant: FANUC CORPORATION, Yamanashi (JP)

(72) Inventor: Tomoya Konishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/249,441

(22) PCT Filed: Nov. 15, 2021

(86) PCT No.: PCT/JP2021/041817
§ 371 (c)(1),
(2) Date: Apr. 18, 2023

(87) PCT Pub. No.: WO2022/107704
PCT Pub. Date: May 27, 2022

(65) Prior Publication Data
US 2023/0381980 A1    Nov. 30, 2023

(30) Foreign Application Priority Data

Nov. 20, 2020   (JP) ................. 2020-193395

(51) Int. Cl.
*B25J 19/00* (2006.01)
(52) U.S. Cl.
CPC ....... *B25J 19/0004* (2013.01); *B25J 19/0029* (2013.01); *B25J 19/0075* (2013.01)

(58) Field of Classification Search
CPC .... B25J 9/101; B25J 19/0004; B25J 19/0029; B25J 19/0075
See application file for complete search history.

(56) References Cited

U.S. PATENT DOCUMENTS

| 7,680,551 | B2* | 3/2010 | Ikeda ................. B25J 9/101 |
| | | | 318/568.25 |
| 9,796,098 | B2* | 10/2017 | Ootani .................. B25J 9/101 |
| 10,744,637 | B2* | 8/2020 | Fujioka ................. B25J 9/101 |
| 2010/0050806 | A1* | 3/2010 | Ono ................... B25J 18/005 |
| | | | 74/490.01 |
| 2022/0281101 | A1* | 9/2022 | Ishizuka ................. B25J 9/06 |

FOREIGN PATENT DOCUMENTS

| JP | H01177990 A | 7/1989 |
| JP | H03281190 A | 12/1991 |
| JP | 2003170384 A | 6/2003 |
| JP | 2006021299 A | 1/2006 |
| JP | 2013006241 A | 1/2013 |
| JP | 2015085393 A | 5/2015 |
| JP | 2018140456 A | 9/2018 |

* cited by examiner

*Primary Examiner* — William C Joyce
(74) *Attorney, Agent, or Firm* — Maier & Maier, PLLC (57) ABSTRACT

An articulated robot including a base, an arm supported so as to be rotatable about a predetermined axis with respect to the base and rotatable within a rotational angle range smaller than ±180°, and a hollow shaft that is disposed outside the rotational angle range and stands upward from the base to be parallel to the axis. A cable body is wired from the base to the arm through an inside of the shaft. The articulated robot includes a stopper embedded in a side surface of the shaft, the stopper against which a side surface of the arm rotated beyond the rotational angle range abuts.

5 Claims, 9 Drawing Sheets

ARTICULATED ROBOT

TECHNICAL FIELD

The present disclosure relates to an articulated robot.

BACKGROUND

Conventionally, there is a known SCARA robot in which a hollow shaft is disposed at a rear portion of a base installed on the floor and a cable is wired through the inside of the shaft to an arm supported so as to be rotatable about a vertical axis with respect to the base (for example, see Japanese Unexamined Patent Application, Publication No. 2018-140456 and Japanese Unexamined Patent Application, Publication No. 2015-85393).

These SCARA robots have stoppers for limiting the arm turning angle, and each of the stoppers is constituted by a bolt head fastened to a lower surface of the arm and a rubber elastic portion fixed to a side surface of the base.

SUMMARY

According to an aspect of the present disclosure, there is provided an articulated robot including: a base; an arm supported so as to be rotatable about a predetermined axis with respect to the base and rotatable within a rotational angle range smaller than ±180°; and a hollow shaft that is disposed outside the rotational angle range and stands upward from the base to be parallel to the axis, wherein a cable body is wired from the base to the arm through an inside of the shaft, and wherein the articulated robot further includes a stopper embedded in a side surface of the shaft, the stopper against which a side surface of the arm rotated beyond the rotational angle range abuts.

DETAILED DESCRIPTION OF THE EMBODIMENTS

In the case of a SCARA robot with a large transportable weight, a stopper that uses a bolt head cannot sufficiently absorb the kinetic energy. In addition, the space where a large stopper that can absorb large kinetic energy is installed is limited, and the arm turning angle range may be limited to a narrower range.

Thus, there is a demand for an articulated robot equipped with a stopper that can absorb large kinetic energy while securing a wide arm turning angle range.

A robot 1 according to an embodiment of the present disclosure will be described below with reference to the drawings.

Figure 1:
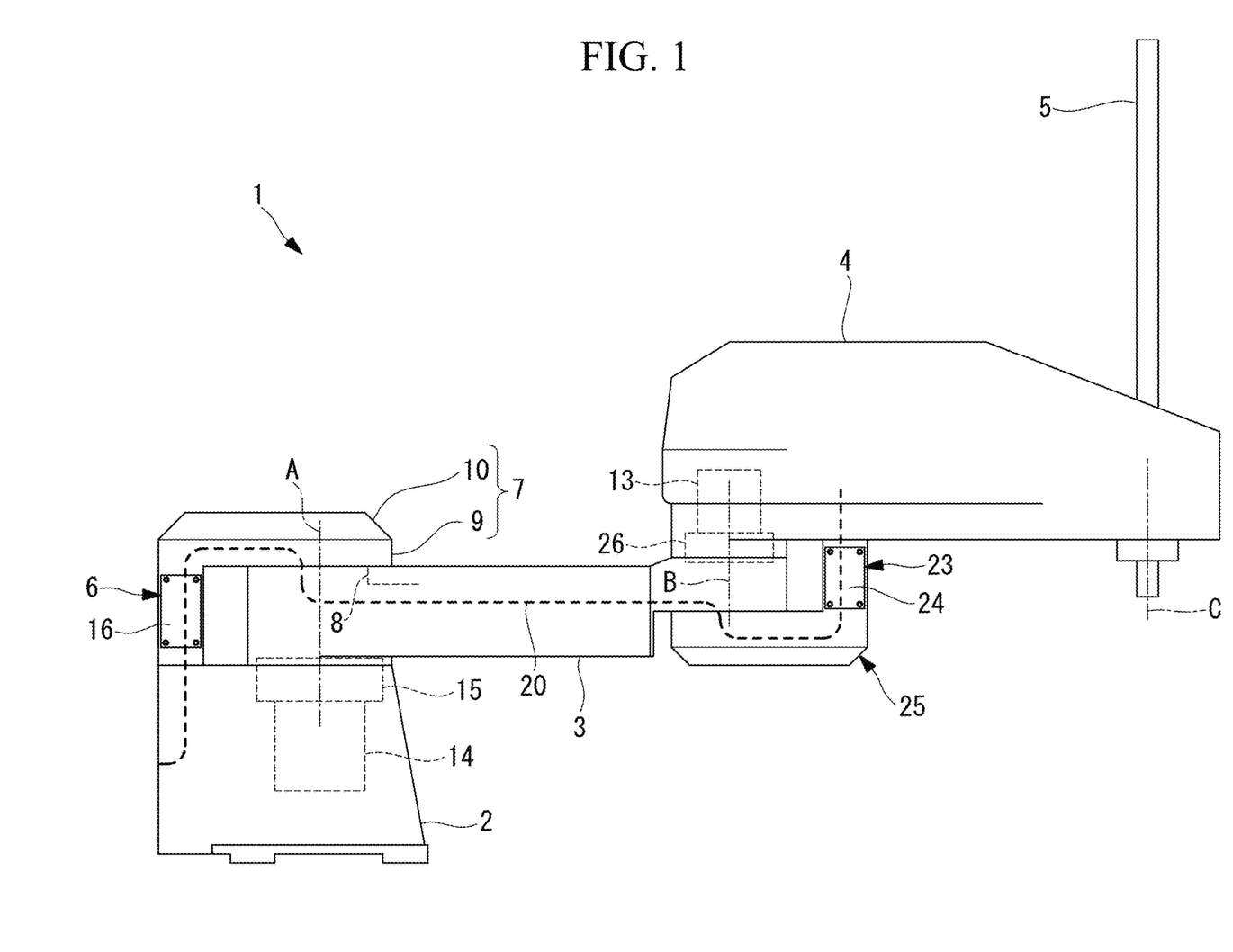
FIG. 1 is a side view of a robot according to an embodiment of the present disclosure.

As illustrated in FIG. 1, the robot 1 according to the present embodiment is a SCARA robot, for example. It should be noted that the structure of the present disclosure is not limited to the SCARA robot and can be applied to an articulated robot of any other configuration regarding the axes.

The robot 1 of the present embodiment is equipped with a base 2 installed on the floor, a first arm (arm) 3 supported so as to be rotatable about a vertical first axis A with respect to the base 2, and a second arm 4 supported so as to be rotatable about a second axis B parallel to the first axis A. For example, a ball screw spline shaft 5 that moves up and down in a direction along a vertical third axis C and rotates about the third axis C is attached to the tip of the second arm 4.

The first arm 3 is attached to the upper surface of the base 2. As illustrated by a solid line in FIG. 2, the first arm 3 is supported so as to be rotatable about the first axis A within the rotational angle range smaller than ±180°, for example, ±140°, from the origin position at which the first arm 3 extends forward with respect to the base 2.

Figure 2:
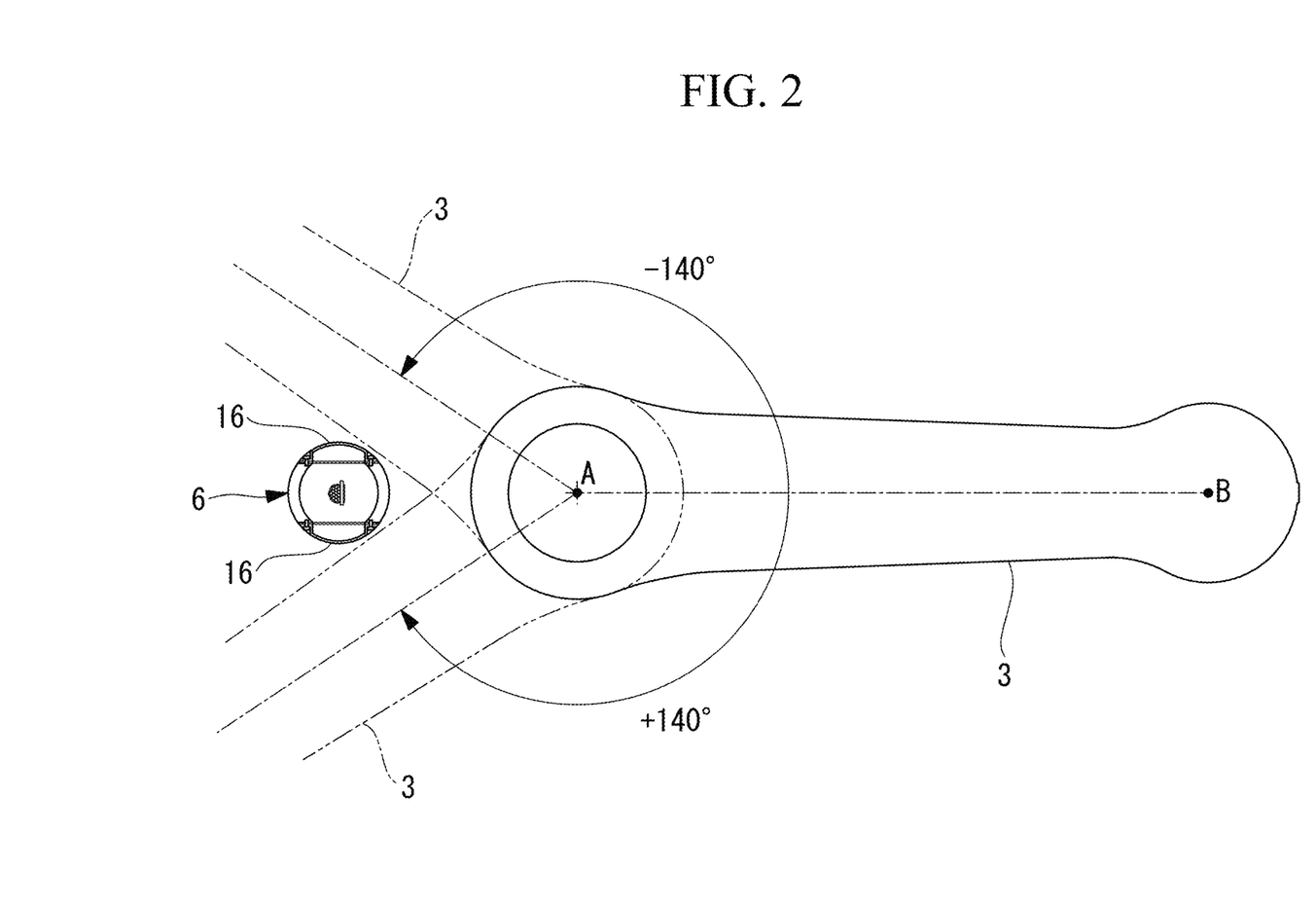
FIG. 2 is a plan view illustrating the positional relationship between a rotational angle range of a first arm of the robot illustrated in FIG. 1 and a shaft for wiring a cable body.

A shaft 6 is installed on the base 2, at a position apart from the first arm 3 and at a backside of the first arm 3, and outside the rotational angle range of the first arm 3 illustrated by chain lines in FIG. 2 such that the shaft 6 stands upward from the upper surface of the base 2 in the vertical direction along the first axis A.

The shaft 6 is integral with the base 2, and a connecting portion 7 that bridges the shaft 6 and the first arm 3 is disposed on the shaft 6.

The base 2, the shaft 6, the connecting portion 7, and the first arm 3 all have a hollow structure. A hollow hole 8 that connects the inside space of the connecting portion 7 and the inside space of the first arm 3 is formed in the upper surface of the first arm 3 and near the first axis A.

The connecting portion 7 includes a connecting member 9 that connects the upper portion of the shaft 6 to the upper surface of the first arm 3, and a cover member 10 detachably attachable to the upper portion of the connecting member 9 with bolts. By detaching the cover member 10 from the connecting member 9, the inside space of the shaft 6 and the hollow hole 8 of the first arm 3 become exposed upward, and thus installation of a cable body 20 described below can be facilitated.

The cable body 20 from a wiring board on the rear surface of the base 2 passes through the inside of the base 2, the inside of the shaft 6, and the inside of the connecting portion 7, and is inserted into the first arm 3 from the hollow hole 8. The cable body 20 includes, for example, cables for driving the second arm 4 and the ball screw spline shaft 5 and a cable or an air tube for driving a tool attached to the ball screw spline shaft 5.

Figure 3:
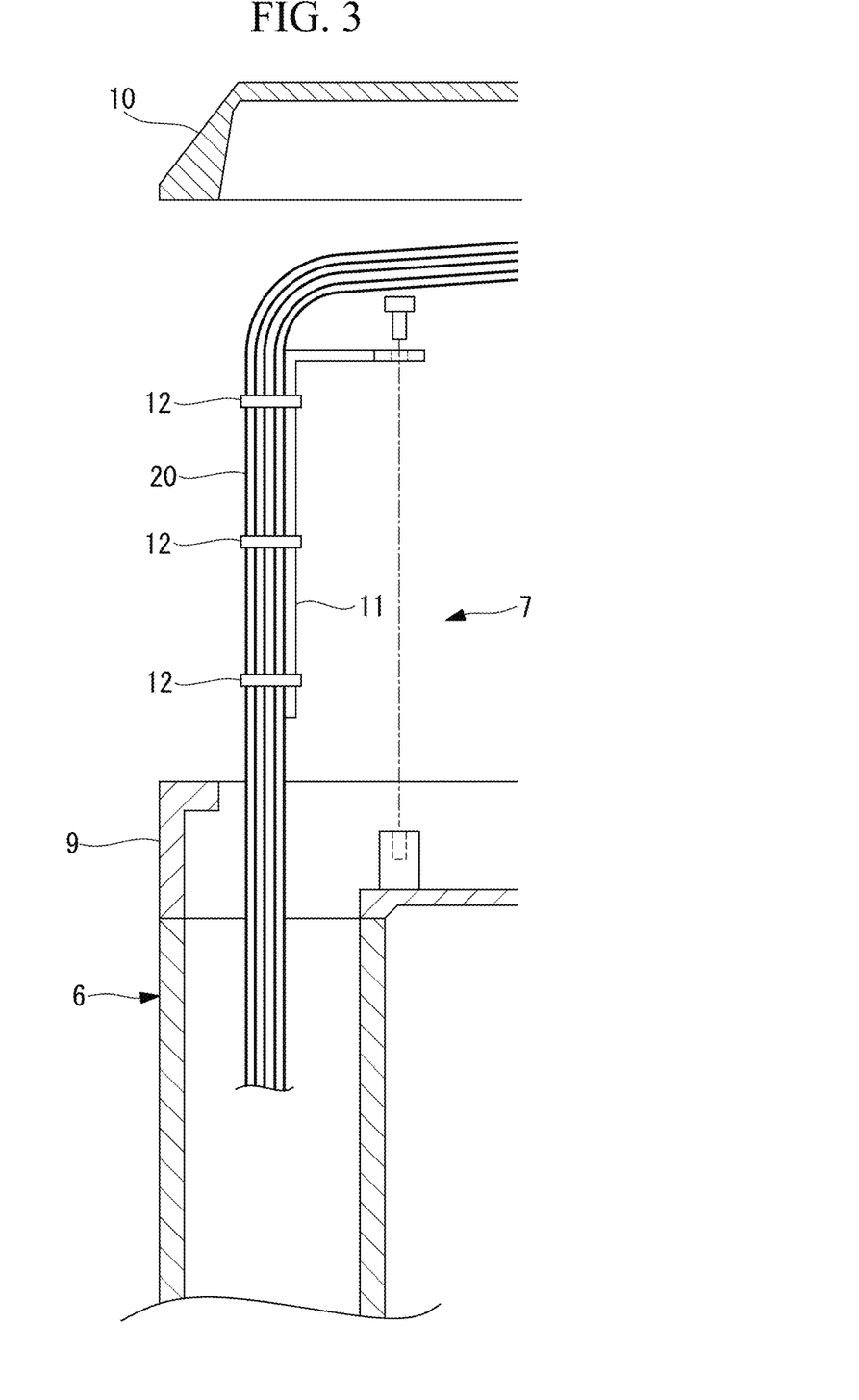
FIG. 3 is a partial vertical sectional view illustrating installation of a cable body into the inside of the shaft of the robot illustrated in FIG. 1.
Figure 4:
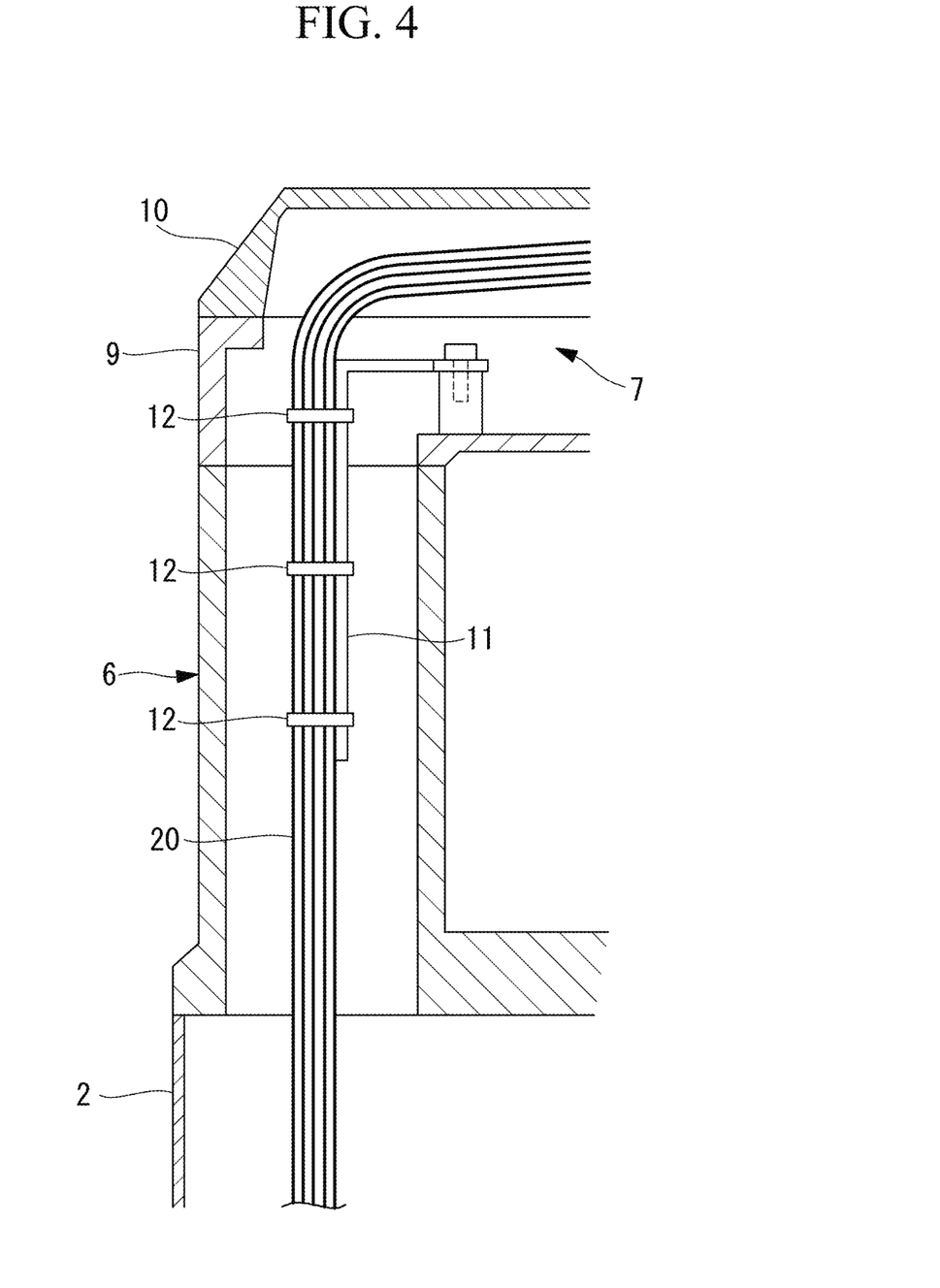
FIG. 4 is a partial vertical sectional view illustrating a state in which the cable body illustrated in FIG. 3 is fixed inside the shaft.

In order to install the cable body 20 in the robot 1, first, the cover member 10 is detached from the connecting member 9 to expose the space inside the shaft 6 and the hollow hole 8 of the first arm 3. In this state, the cable body 20 is drawn out from a side of the base 2 via the space inside the shaft 6, and, as illustrated in FIG. 3, the cable body 20 is tied with binders 12, such as nylon bands, onto an L-shaped bracket 11. The banded cable body 20 is put back into the inside space of the shaft 6 together with the bracket 11, and, as illustrated in FIG. 4, the bracket 11 is fixed to the connecting member 9.

As a result, the cable body 20 can be easily fixed to the robot 1. The leading end portion of the cable body 20 can be inserted into the first arm 3 from the exposed hollow hole 8 of the first arm 3, and be connected to, for example, a motor 13 for the second arm 4 disposed on the further leading end side; thus, the cable body 20 can be easily installed.

A motor 14 and a reducer 15 that drive the first arm 3 with respect to the base 2 are disposed inside the base 2, and are fixed to the first arm 3 and the base 2 from under the first arm 3 so as to be on the first axis A.

Figure 5:
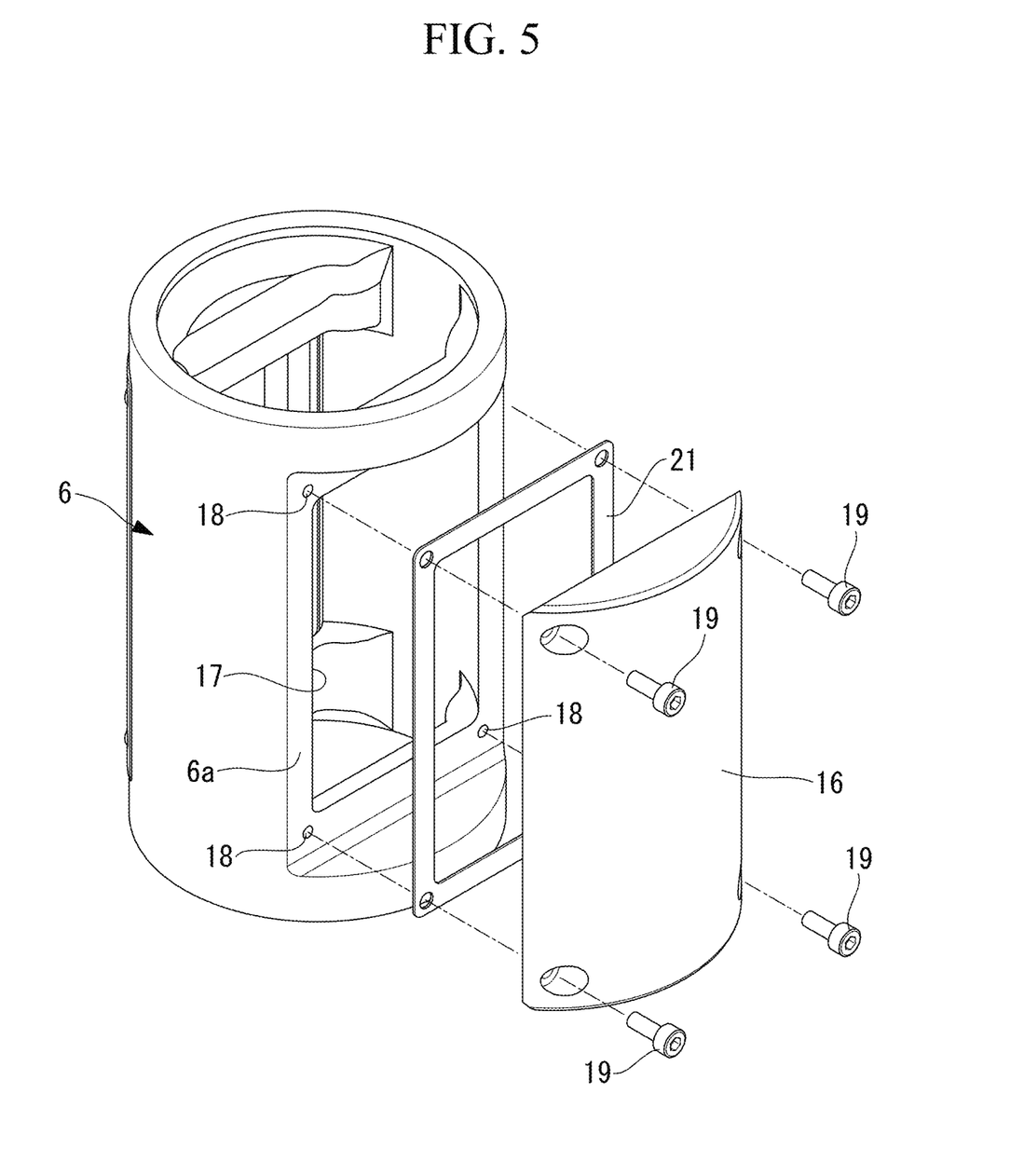
FIG. 5 is a partial perspective view illustrating the shaft of the robot illustrated in FIG. 1 and a stopper to be integrated with the shaft.

As illustrated in FIG. 5, the robot 1 according to the present embodiment includes stoppers 16 on a side surface of the shaft 6. The shaft 6 is cylindrically formed, and has recesses 6a on two sides in the circumferential direction about the first axis A, and each of the recesses 6a is formed by cutting out one portion of the outer peripheral surface. The bottom surface of each of the recesses 6a is constituted by a flat plane substantially parallel to the first axis A. The bottom surface of each of the recesses 6a is provided with an opening 17 in communication with the space inside the shaft 6 and multiple screw holes 18 formed at the periphery of the opening 17.

The stoppers 16 have a shape complementary to the recesses 6a, respectively, fill the recesses 6a when fitted into the recesses 6a, each have an arc-shaped outer surface that forms part of the cylindrical surface which is the outer peripheral surface of the shaft 6, and are formed of a metal material thinner than the shaft 6. The stoppers 16 are respectively fitted into the recesses 6a in the shaft 6 to thereby close the openings 17 of the recesses 6a, and are detachably attached to the shaft 6 with multiple bolts 19 fastened into the screw holes 18.

Figure 6:
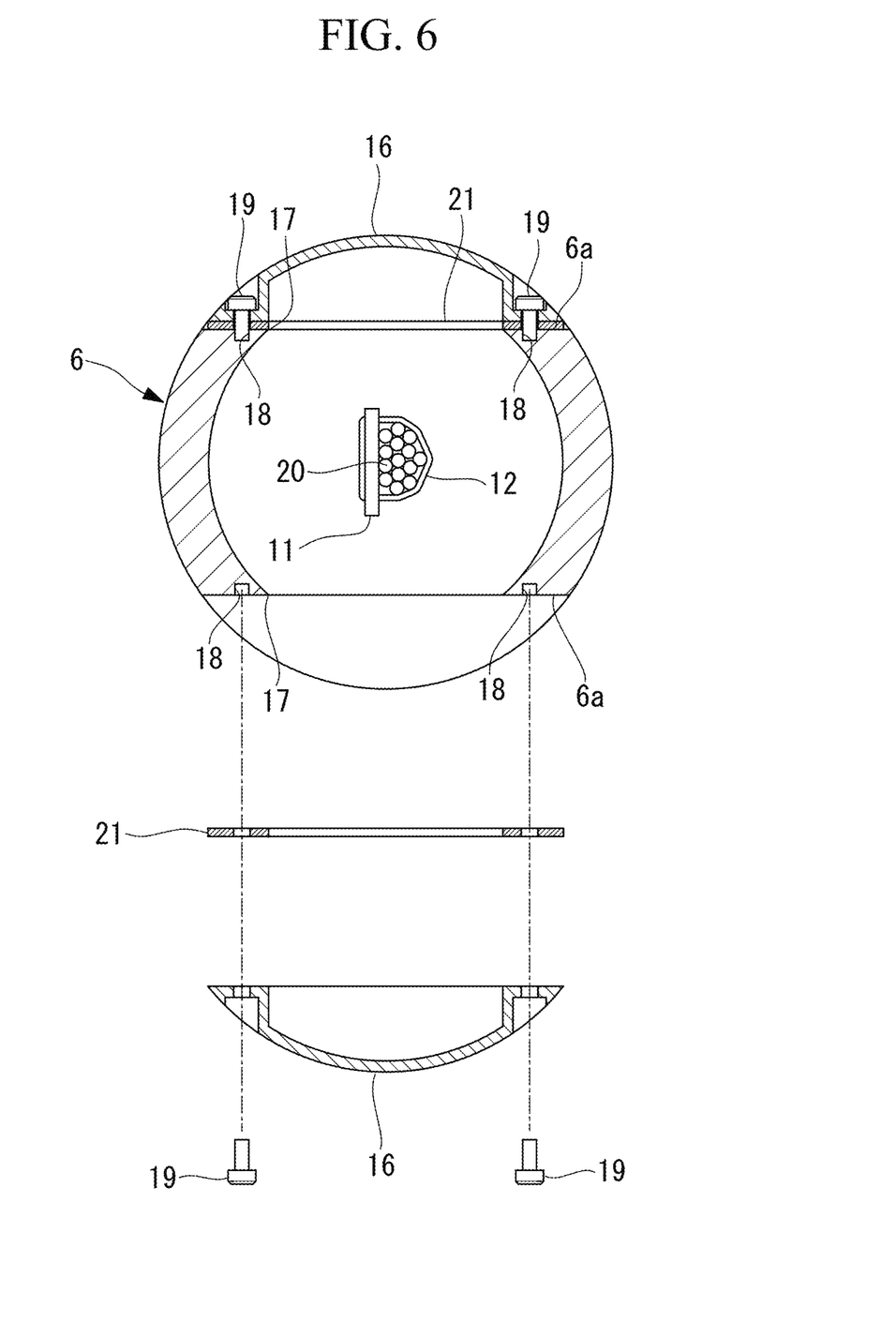
FIG. 6 is a vertical sectional view illustrating recesses of the shaft of the robot illustrated in FIG. 1, and stoppers and gaskets to be integrated with the recesses.

As illustrated in FIGS. 5 and 6, a gasket (sealing member) 21 is interposed between the stopper 16 and the bottom surface of the recess 6a. By fixing the stoppers 16 to the recesses 6a with the gaskets 21 therebetween, the openings 17 in the recesses 6a become sealed, and invasion of liquid or dust into the shaft 6 from outside can be prevented.

Each of the stoppers 16 is embedded in the corresponding recess 6a of the shaft 6 so that the center position in a direction along the first axis A aligns with the center, in the direction along the first axis A, of the side surface of the first arm 3.

Figure 7:
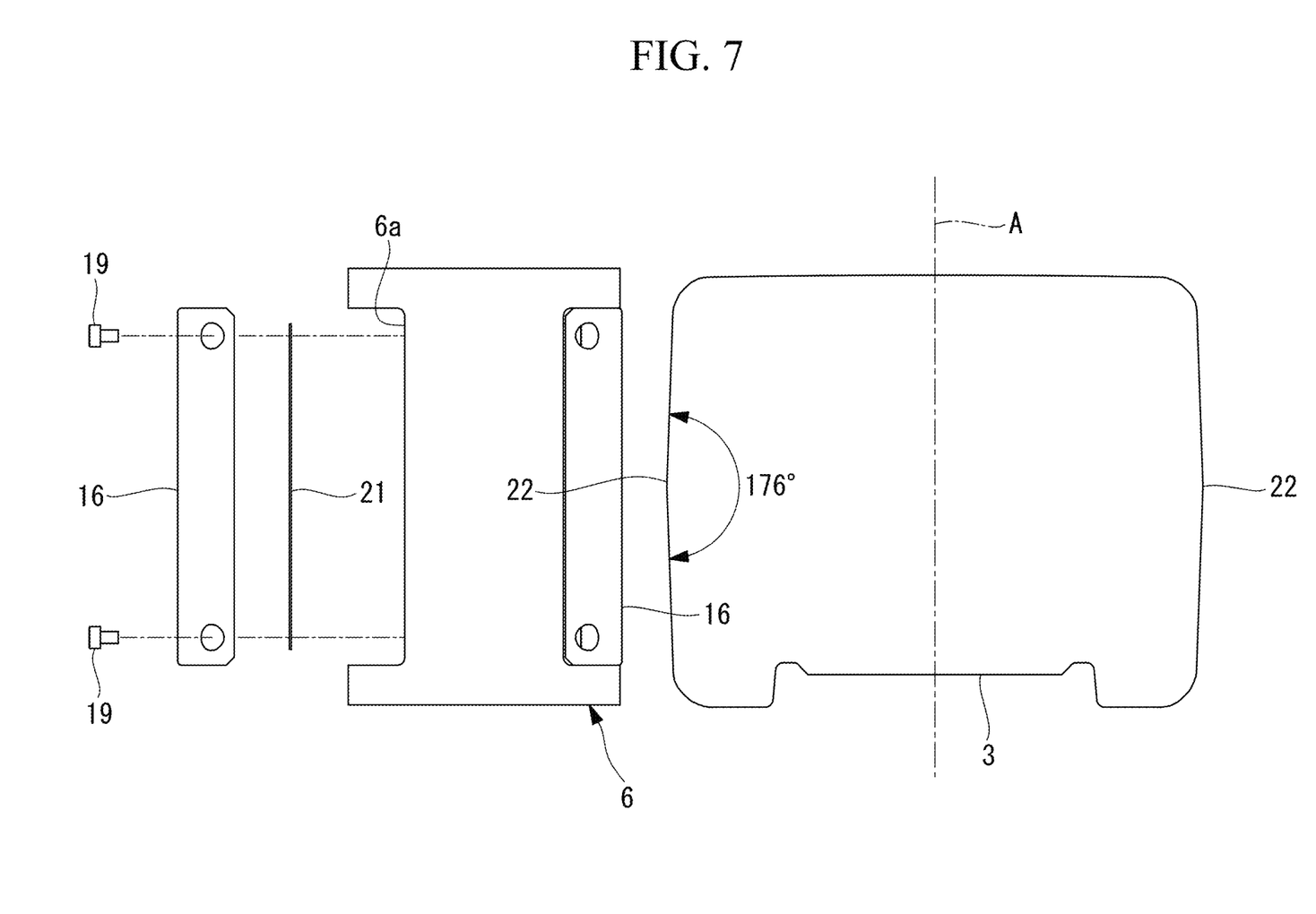
FIG. 7 includes a side view of the stopper and a horizontal sectional view of a part of the first arm to illustrate the relationship with the stopper of the robot illustrated in FIG. 1.

As illustrated by a horizontal section of FIG. 7, each of the two side surfaces of the first arm 3 has a convex shape throughout the entire length in the length direction of the first arm 3, and the convex shape has a ridge 22 that protrudes most outwardly at the center in the direction along the first axis A. The convex shape is, for example, constituted by two flat surfaces that meet at an angle of 174° to 176°.

The convex shapes of the two side surfaces of the first arm 3 are formed by the draft used in casting the first arm 3.

The operation of the robot 1 according to the present embodiment configured as such will be described below.

As illustrated in FIG. 2, according to the robot 1 of the present embodiment, in a normal operation state, the first arm 3 moves within a rotational angle range of ±140°, and the side surfaces of the first arm 3 never come into contact with the stoppers 16 of the shaft 6.

However, when, for example, calibration is lost for some reason, the first arm 3 may move beyond the normal rotational angle range, and, as a result, it is possible that any one of the side surfaces of the first arm 3 would come into contact with the stopper 16 embedded in the shaft 6.

In such a case, the convex-shaped side surface of the first arm 3 comes into contact with the stopper 16 at the position of the ridge 22 that protrudes most outwardly, and deforms the stopper 16. Then, until the first arm 3 comes to a stop, the side surface of the first arm 3 gradually penetrates into the outer surface of the stopper 16.

In other words, the kinetic energy of the first arm 3 is absorbed by deformation of the stopper 16. In such a case, according to the robot 1 of the present embodiment, the side surface of the first arm 3 contacts the outer surface of the stopper 16 over a wide range before the first arm 3 makes a stop. Thus, there is an advantage in that even when the transportable weight of the robot 1 is large or when the operation speed is high, the kinetic energy of the first arm 3 can be sufficiently absorbed and the first arm 3 can be more reliably stopped.

Moreover, according to the robot 1 of the present embodiment, since the stoppers 16 are integral with the shaft 6 for wiring the cable body 20, there is no need to ensure a space for installing stoppers 16 outside the shaft 6, and thus the limitation on the rotational angle range of the first arm 3 can be minimized.

Since the stoppers 16 are detachably attached to the recesses 6a of the shaft 6 with the bolts 19, the deformed stoppers 16 can be easily replaced.

By removing the stoppers 16 from the recesses 6a of the shaft 6, the openings 17 in the bottom surfaces of the recesses 6a can be uncovered. This offers an advantage in that the task of drawing out the cable body 20 from the base 2 to above the shaft 6 through the inside space of the shaft 6 and the task of wiring the cable body 20 can be easily carried out by using the uncovered openings 17.

According to the robot 1 of the present embodiment, by embedding the stoppers 16 in the recesses 6a of the shaft 6, the outer peripheral surface of the shaft 6 and the outer surfaces of the stoppers 16 constitute a smoothly connected single cylindrical surface; thus, there is an advantage in that no stepped portions where liquid and dust accumulate are formed on the stoppers 16. Thus, issues such as adhesion of liquid and dust which have accumulated on the stepped portions onto workpieces to be handled can be reduced. This is particularly effective when the workpiece is a food product.

In addition, in the present embodiment, since the cable body 20 is wired from the upper surface of the first arm 3 to the inside of the first arm 3 through the shaft 6 that stands upward at a backside of the first arm 3, the reducer 15 and other components below the first arm 3 do not have to have a hollow structure. In this manner, the increase in size and cost of the base 2 can be prevented.

In the present embodiment, the outer peripheral surfaces of the stoppers 16 are given a flat shape, while the side surfaces of the first arm 3 are given a convex shape by the draft used in casting the first arm 3. Alternatively, as illustrated in FIGS. 8 and 9, the side surfaces of the arm 3 may be given a flat shape, and the outer surfaces of the stoppers 16 may be given a convex shape that protrudes most outwardly at the center.

Figure 8:
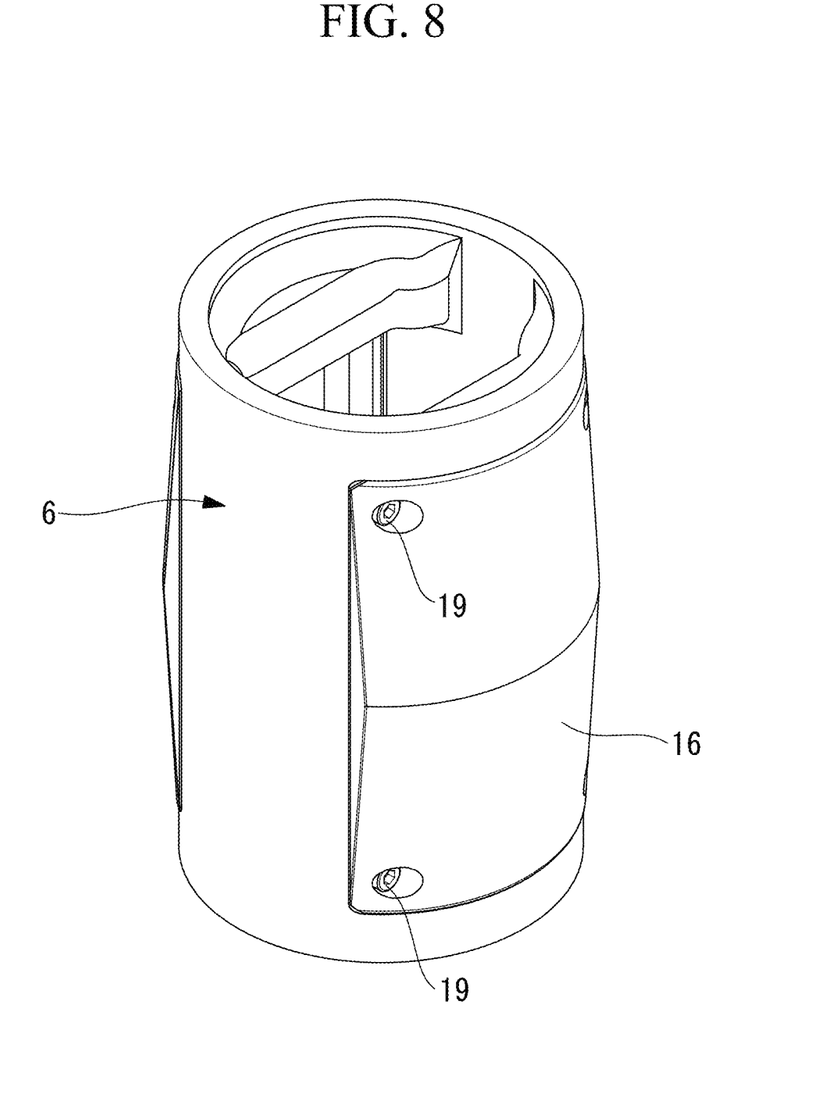
FIG. 8 is a perspective view illustrating a modified example of the stopper of the robot illustrated in FIG. 1.
Figure 9:
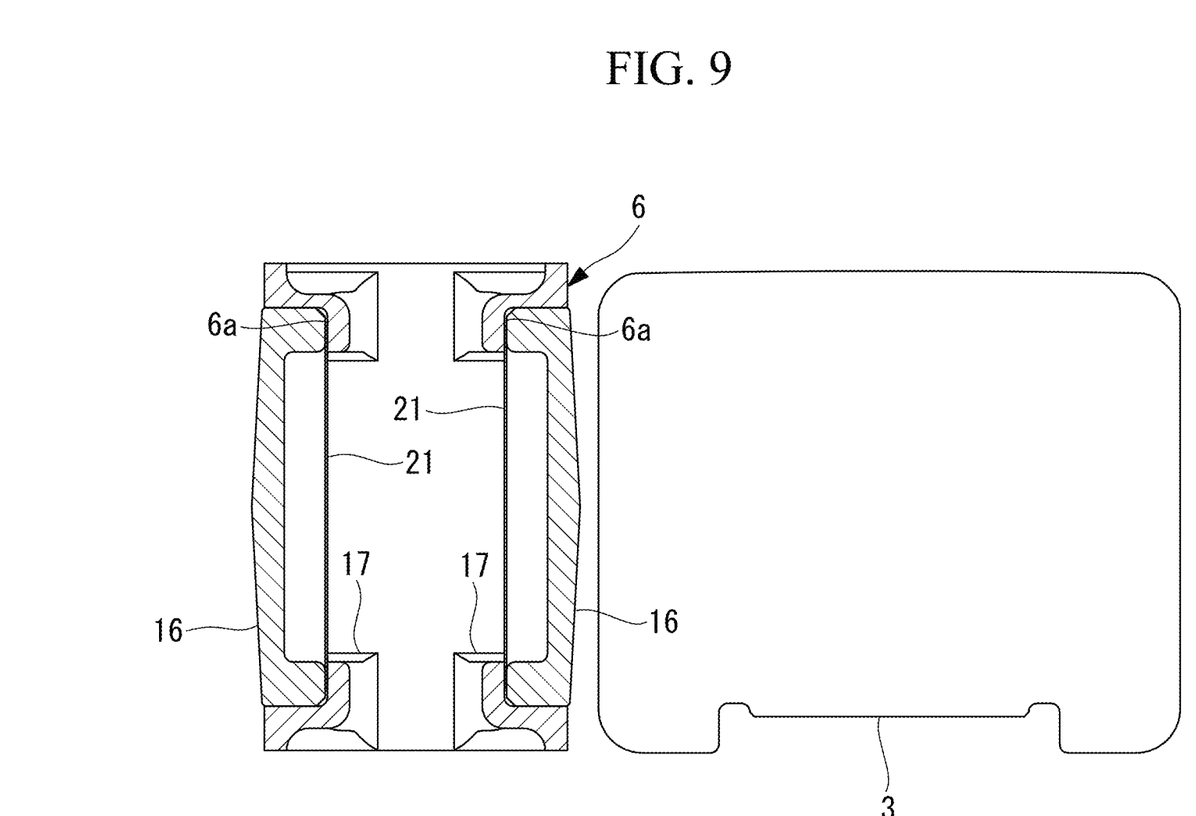
FIG. 9 includes a side view of the stopper and a horizontal sectional view of a part of the first arm to illustrate the relationship between the stopper illustrated in FIG. 8 and the first arm.

In this case also, as illustrated in FIG. 8, the stoppers 16 are preferably shaped so that the upper edges of the stoppers 16 as embedded in the recesses 6a conform to the outer peripheral surface of the shaft 6 so that stepped portions are not generated at the upper edges and accumulation of dust and liquid is prevented.

In the present embodiment, the stoppers 16 are formed of a metal material, and the metal material may be any desired metal material. Alternatively, instead of the metal material, a resin material such as a plastic or rubber may be used.

Furthermore, although the kinetic energy of the first arm 3 is absorbed by deformation of the stopper 16 contacting the first arm 3, the kinetic energy may be additionally reduced by braking the motor upon detecting the impact of the first arm 3 contacting the stopper 16.

In the present embodiment, the shaft 6 has a cylindrical shape; alternatively, the shaft 6 may have any desired tubular shape.

Furthermore, although the openings 17 are formed in the bottom surface of the recesses 6a, the openings 17 are optional. Eliminating the openings 17 is preferable for the case where stoppers 16 composed of, for example, an elastic material with lower rigidity are used since the entire bottom surfaces of the recesses 6a can support the stoppers 16.

In the present embodiment, an example is described in which the stoppers 16 stop the first arm 3 rotating about the first axis A with respect to the base 2; however, stoppers 24 that stop the second arm 4 with respect to the first arm 3 may have the same structure.

In other words, as illustrated in FIG. 1, a hollow shaft 23 is placed to extend downward from the lower surface of the second arm 4 and parallel to the second axis B, and the end surface of the shaft 23 and the lower surface of the first arm 3 are connected by a hollow connecting portion 25. The stoppers 24 against which the side surfaces of the first arm 3 abut when the second arm 4 is rotated beyond the rotational angle range with respect to the first arm 3 may be integrated with two side surfaces of the shaft 23.

As illustrated by the chain lines in FIG. 1, the cable body 20 that has passed through the inside of the first arm 3 passes through the connecting portion 25 and the inside space of the shaft 23 and connects to the motor 13 for the second arm 4 or the motor for the ball screw spline shaft disposed in the second arm 4. In the drawings, reference sign 26 indicates a reducer.

The invention claimed is:

1. An articulated robot, comprising:
    a base;
    an arm supported so as to be rotatable about a predetermined axis with respect to the base and rotatable within a rotational angle range smaller than ±180°; and
    a hollow shaft that is disposed outside the rotational angle range and stands upward from the base to be parallel to the axis,
    wherein a cable body is wired from the base to the arm through an inside of the shaft, and
    wherein the articulated robot further comprises a stopper embedded in a side surface of the shaft, the stopper against which a side surface of the arm rotated beyond the rotational angle range abuts.

2. The articulated robot according to claim 1, wherein the stopper is detachably attached to the side surface of the shaft.

3. The articulated robot according to claim 2,
    wherein an opening that communicates with an inside space of the shaft is formed in the side surface of the shaft, and
    the stopper is attached to a position of the shaft to close the opening.

4. The articulated robot according to claim 3, further comprising a sealing member that is interposed between the stopper and the shaft and seals an entire periphery of the opening.

5. The articulated robot according to claim 1, wherein one of a side surface of the arm and a surface of the stopper has a convex shape that protrudes outwardly at a middle position in a direction along the axis, and an other of the side surface and the surface has a flat shape without recesses or protrusions in the direction along the axis.

* * * * *